(12) United States Patent
Roget et al.

(10) Patent No.: US 7,905,265 B2
(45) Date of Patent: Mar. 15, 2011

(54) AIRCRAFT TIRE WITH COMPOSITE CABLES

(75) Inventors: Cyrille Roget, Greer, SC (US); Lilian Vialatte, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 830 days.

(21) Appl. No.: 11/806,412

(22) Filed: May 31, 2007

(65) Prior Publication Data

US 2007/0235116 A1 Oct. 11, 2007

Related U.S. Application Data

(60) Division of application No. 10/686,679, filed on Oct. 17, 2003, now abandoned, which is a continuation of application No. PCT/EP02/04255, filed on Apr. 17, 2002.

(30) Foreign Application Priority Data

Apr. 19, 2001 (FR) ..................................... 01 05337

(51) Int. Cl.
*B60C 9/18* (2006.01)
*B60C 9/20* (2006.01)

(52) U.S. Cl. ........ 152/527; 152/451; 152/533; 152/536; 152/556; 152/557

(58) Field of Classification Search .................. 152/451, 152/527, 531, 533, 536, 556, 557
See application file for complete search history.

(56) References Cited

U.S. PATENT DOCUMENTS

| | | | |
|---|---|---|---|
| 4,155,394 A | 5/1979 | Shepherd et al. | |
| 4,244,414 A | 1/1981 | Uemura et al. | |
| 4,865,098 A | 9/1989 | Majerus | |
| 4,893,665 A | 1/1990 | Reuter et al. | |
| 4,914,902 A | 4/1990 | Keefe, Jr. | |
| 5,285,835 A | 2/1994 | Ueyoko et al. | |
| 5,427,167 A | 6/1995 | Watanabe et al. | |
| 5,476,129 A | 12/1995 | Shoyama | |
| 5,522,443 A | 6/1996 | Ueyoko et al. | |
| 6,273,163 B1 | 8/2001 | Materne et al. | |
| 6,601,626 B2 * | 8/2003 | Royer et al. | 152/533 X |

FOREIGN PATENT DOCUMENTS

EP 0 335 588 10/1989

* cited by examiner

*Primary Examiner* — Adrienne C Johnstone
(74) *Attorney, Agent, or Firm* — Rooney Ingersoll & Rooney PC

(57) ABSTRACT

An aircraft tire inflated to high pressure and including a tread and a crown reinforcement in the form of composite textile cables which form at least one twin ply of two layers of crossed elements obtained by winding, in a zigzag around a cylindrical support and from one edge of the crown reinforcement to the other, a strip of at least one reinforcement until the two layers of crossed elements form angles of opposing directions of between 8° and 30° with the circumferential direction.

2 Claims, 2 Drawing Sheets

AIRCRAFT TIRE WITH COMPOSITE CABLES

This application is a division of U.S. application Ser. No. 10/686,679 filed on Oct. 17, 2003, now abandoned and which is a continuation of International Application Serial No. PCT/EP02/04255, filed on Apr. 17, 2002, published in English as WO 02/085646 on Oct. 31, 2002.

BACKGROUND

The present invention relates to a tire having a radial carcass reinforcement which is intended to bear heavy loads and is inflated to relatively high pressures, and in particular to an aircraft tire.

The radial carcass reinforcements of such tires generally comprise a plurality of plies of textile reinforcement elements, which are anchored within each bead to at least one annular reinforcement element and most frequently to a single bead wire. The reinforcement elements of said reinforcements are wound around said bead wire from the inside to the outside, forming upturns the respective ends of which are spaced radially relative to the axis of rotation of the tire. The harsh conditions under which aircraft tires are used are such that the endurance of the beads is low, in particular at the level of the upturns of the carcass reinforcement.

A significant improvement in the performance is obtained by separating the plies of the carcass reinforcement into two groups. The first group comprises the axially inner plies of the carcass reinforcement in the zone of the sidewalls and beads, said plies then being wound around an anchoring bead wire within each bead, from the inside to the outside of the tire. The second group is formed of at least one axially outer ply in the zone above, which ply is generally partially wound around the bead wire, from the outside to the inside of the tire. Such arrangements are known and are disclosed for example in U.S. Pat. No. 4,244,414 (FIG. 2 of said patent).

The endurance of the beads thus constituted may be improved by the presence within each bead of an additional reinforcement ply wound around the bead wire and thus forming an axially outer strand and an axially inner strand, said reinforcement ply being the ply closest to the filling or infill rubber profiled element, which is generally triangular and radially above the anchoring bead wire. An architecture of this type is disclosed in U.S. Pat. No. 5,285,835.

Likewise a solution was proposed consisting of arranging the edge(s) of said axially outer ply (plies) between the upturns of the axially inner plies.

The endurance of the beads of aircraft tires is however in need of improvement, in particular when said beads are subjected to great overloads which may impart thereto loadings of the order of 50% of their height and more. The progress to be expected of development of the architecture of the beads would seem, at least at present, to be fairly limited, owing to the very fact of the necessary number of carcass plies, generally formed of reinforcement elements of aliphatic polyamide, in order to withstand the tension due to what is called the test pressure which, as is known, must be equal to four times the operating pressure. The large number of said carcass plies obviously involves the multiplication of the free ends of reinforcement elements, the multiplication of the interfaces between plies, greater hysteresis losses and therefore higher operating temperatures, all of which are factors favorable to increasing the fatigue of the beads and limiting their endurance.

The solution proposed by the present invention to improve the endurance of the beads of an aircraft tire lies in the replacement of the carcass plies of aliphatic polyamide by carcass plies formed of composite reinforcement elements, that is to say ones formed of yarns of different moduli.

SUMMARY OF THE INVENTION

In accordance with the invention, an aircraft tire, inflated to high pressure, having a tread, a crown reinforcement and a radial carcass reinforcement, this radial carcass reinforcement comprising a plurality of textile reinforcement elements oriented substantially radially (that is to say forming an angle of between 80° and 100° with the circumferential direction), this armature being anchored to at least one circumferential reinforcement armature within each bead, this tire being characterized in that the radial reinforcement elements of the carcass reinforcement are composite cables formed by plying at least one yarn having a modulus of elasticity in tension at least equal to 2000 cN/tex, with at least one yarn having a modulus of elasticity upon traction at most equal to 1500 cN/tex, said elasticity moduli of said yarns being measured for a tensile force equal to ten percent (10%) of the breaking load of each yarn in question.

Preferably, the aircraft tire according to the invention is such that some of the reinforcement elements are anchored around a circumferential reinforcement element (such as, for example, a bead wire), axially from the inside towards the outside and the other reinforcement elements are anchored around said circumferential reinforcement element from the outside towards the inside.

Another variant according to the invention is an aircraft tire, inflated to high pressure, with a tread, a crown reinforcement and a radial carcass reinforcement, comprising:

at least two axially inner plies formed of textile reinforcement elements oriented radially (that is to say, forming on the tire an angle of between 80° and 100° with the circumferential direction), said two plies being wound around at least one bead wire within each bead from the inside to the outside, forming upturns, and, at least one axially outer ply of textile elements oriented radially, which is superposed radially on the inner plies beneath the crown reinforcement to extend along the upturns of said inner plies in the beads, and characterized in that the radial reinforcement elements of all the plies of the carcass reinforcement are cables formed by plying at least one yarn, said yarn having a modulus of elasticity in tension at least equal to 2000 cN/tex, with at least one yarn whether overtwisted or not, of a modulus of elasticity in tension at most equal to 1500 cN/tex, said elasticity moduli of each of said yarns being measured for a tensile force equal to ten percent (10%) of the breaking load of the corresponding yarn.

Thus reinforced with cables formed of yarns having different elasticity moduli at low deformations, the plies of the carcass reinforcement, surprisingly, are more capable of withstanding tensile stresses and fatigue stresses (in compression in particular).

DEFINITIONS a yarn is formed of one or more unit filaments;
a folded yarn is a yarn which has undergone a twisting operation before being assembled by plying with at least one other yarn to form a cable or a plied yarn ("cord").

It is understood that with identical filaments it is possible, owing to appropriate twisting operations, to form a high-modulus folded yarn and a low-modulus folded yarn, these two folded yarns of different moduli thus obtained then being assembled by plying to form the reinforcement element of one or more of the plies of the carcass reinforcement of a tire according to the invention.

The moduli of elasticity in tension of the yarns result, as is known per se, from the curves representing the tensile forces as a function of the relative elongation which are obtained on the yarns as such before they are incorporated into the reinforcement element; these elasticity moduli correspond to secant moduli at the point of deformation corresponding to a tensile force equal to 10% of the breaking load of the yarn in question.

The composite cables or hybrid cables used above are known per se. For example, U.S. Pat. No. 3,977,172 teaches using them to reinforce a manufactured product. U.S. Pat. No. 4,893,665 claims the use of cables, formed of at least two cords made of aromatic polyamide and a core in the form of at least one aliphatic polyamide or polyester filament. The same type of cable is more particularly used as reinforcement element for a crown reinforcement for an aircraft tire. Patent EP 335 588 describes the particularly advantageous use of composite cables as circumferential reinforcement elements for a covering ply for a working crown reinforcement having two plies of metal cables crossed from one ply to the next. However, none of these documents either describes or suggests the combination of the characteristics of the subject of the invention, in particular the use of the composite cables as defined as reinforcements for a carcass reinforcement.

It is advantageous, in the case of an aircraft tire, for the composite cables used in the tire according to the invention to be formed of at least two yarns of high elasticity modulus and of a single yarn of low elasticity modulus, said cables having the best compromise between the two properties, namely the reduction of weight of the tire and the fatigue resistance of said cables. The three yarns above are individually overtwisted in suitable manner and are then plied together to form the reinforcement element. Thus, as is known per se, cables having a curve representing the tensile force as a function of the relative elongation $\epsilon$ are obtained which are composed substantially of two parts on either side of a transition point T: a first part in which the modulus of elasticity in tension is low, and a second part in which said modulus is high.

If, as is known, a transition point T is defined as the point of intersection between the curve of tensile force as a function of elongation $\epsilon$ and a straight line parallel to the y-axis of said curve passing through the point of intersection of the tangents to said curve respectively at the origin (corresponding to the point of zero deformation $\epsilon_0$) and at break (deformation at break $\epsilon_R$), the first part is defined between the origin and the deformation $\epsilon_T$ and the second part between the deformation $\epsilon_T$ and the deformation at break $\epsilon_R$. In order that a certain dimensional stability be imparted to the profile of the carcass reinforcement, be it circumferentially and/or meridianly, it is important that the relative elongation $\epsilon_T$ at the transition point T be between 1% and 7%.

The ratio of the gradient of the tangent to the tensile force/relative elongation curve at the point of zero relative elongation on the gradient of the tangent to the tensile force/relative elongation curve at the point of relative elongation at break is advantageously of between 0.08 and 1.0, whereas the breaking load of a reinforcement element is preferably greater than 70 cN/tex.

The plies of composite cables or hybrid cables described above are obtained by coating these cables with a rubber mix referred to as calendering mix, the number of cables per centimeter of ply, measured perpendicular to the direction of said cables, being calculated in order to obtain the necessary tensile strength. In order to increase still further the life of the beads of the tire in question, the calendering mix(es) of the axially inner carcass plies, wound around the anchoring bead wire to form upturns, have secant moduli of extension of a value less than the secant modulus (moduli) of extension of the calendering mixes of the axially outer ply (plies). Said moduli are moduli of extension measured at 10% relative elongation and in accordance with ASTM Standard D 412). The modulus of the single calendering mix of the axially inner plies is advantageously between 4.5 and 6.0 MPa, whereas the modulus of the single mix of the axially outer plies is between 10.0 and 14.0 MPa.

The crown reinforcement for aircraft tires is, as is known per se, composed of a working reinforcement generally formed of textile reinforcement elements, and of a protective reinforcement formed of at least one ply of metal elements or of elements of aromatic polyamide. The working reinforcement is generally composed, radially from the inside to the outside, of at least one ply of circumferential reinforcement elements (a reinforcement element forming with the circumferential direction an angle of between −8° and +8° is said to be circumferential in the present document), and of at least one twin ply of two layers of crossed elements obtained by winding, in a zigzag around a more or less cylindrical support and from one edge of said reinforcement to the other, a strip of at least one reinforcement element until at least said two layers of elements forming angles of opposing directions of between 8° and 30° are formed with the circumferential direction.

The reinforcement elements of the working crown reinforcement are advantageously composite cables of the same nature and structure as the cables forming the carcass reinforcement. There then follow a reduced number of layers in order to obtain the same tensile strength, said lower number resulting in many advantages, namely a reduction in weight, increased ease of manufacture, lower processing costs, a crown which is less thick overall, with as consequences lower operating temperatures, but also shorter curing times, while having a more regular distribution of the curing temperatures in the tire which is not yet vulcanized.

Furthermore, the use of composite cables for the working reinforcement makes it possible, compared with the use of nylon cables, to have a tread mix which is less subject to the tensile stresses, and consequently better resistance to ozone attack at the bottom of hollows (fewer cracks), better resistance to the propagation of said cracks or notches initiated by foreign bodies in the tire, better wear performance, better resistance to the formation of flakes on the tread and better resistance to perforation of said tread which is also due to foreign bodies.

The advantages above will be all the more pronounced if the modulus of calendering of said layers of working crown reinforcement has an intermediate value between the corresponding values of moduli for calendering mixes respectively of the axially outer and inner carcass plies. Said modulus, of the same definition and measured under the same conditions as the moduli specified above, is advantageously between 7.5 and 9.5 MPa.

BRIEF DESCRIPTION OF THE DRAWINGS

The characteristics and other advantages of the invention will be better understood with reference to the description of a non-limitative example, with which are associated drawings, in which.

DESCRIPTION OF PREFERRED EMBODIMENTS

The example given is that of a tire of standardized dimension 1400×530 R 23 (in accordance with the "Tire and Rim Association" standard). The carcass reinforcement 1 is formed of four plies 1A to 1D of radial textile cables. "Radial cables" of an aircraft tire is to be understood to mean cables forming angles which may be within the range 90°±15° with the circumferential direction. Among said four plies, two plies 1A and 1B, which are axially inner in the sidewalls and beads, are wound within each bead 2 around a bead wire 3, having in the case in question a circular cross-section, from the inside to the outside of the tire P, to form upturns 10A and 10B. There is furthermore provided a protective tongue (formed of textile reinforcements of aliphatic polyamide) wound around the bead wire and separating said bead wire from the carcass reinforcement.

The ends of said upturns are distant from the base of the bead, represented by a line YY' parallel to the axis of rotation of the tire and passing through the point of intersection of the vertical wall of the bead and of the frustoconical generatrix of its seat, by respective heights $h_1$ and $h_2$. The height $h_1$, which is the smaller height, is the height of the upturn 10A of the first axially inner ply 1A, whereas the height $h_2$, which is the larger height, is the height of the upturn 10B of the second axially inner ply 1B. The two heights $h_1$ and $h_2$ are equal respectively to 20% and 15% of the height H of the tire on its rim, equal to 394 mm.

By definition, the height of the mounted, inflated tire, viewed in meridian section, is the radial distance measured between that point of the tread which is farthest from the axis of rotation and a line parallel to said axis and distant from said axis by a quantity equal to the standardized nominal radius of the operating rim. A substantially triangular rubber profiled element 5 is arranged axially between the upturns 10A and 10B and the main parts of inner carcass plies which are radially above the bead wire.

The axially outer carcass reinforcement plies 1C and 1D have their edges 10C and 10D which cover axially to the outside and adjacently the upturns 10A and 10B of the plies 1A and 1B of the carcass reinforcement 1. Said plies 1C and 1D are wound around the anchoring bead wire 3 over a portion or circular arc corresponding to an angle at the center of a circle circumscribed on the bead wire at most equal to 180°, such that the ends of said plies 1C and 1D are radially located below the straight line parallel to the axis of rotation passing through the center of gravity of the cross-section of the bead wire 3.

Figure 1:
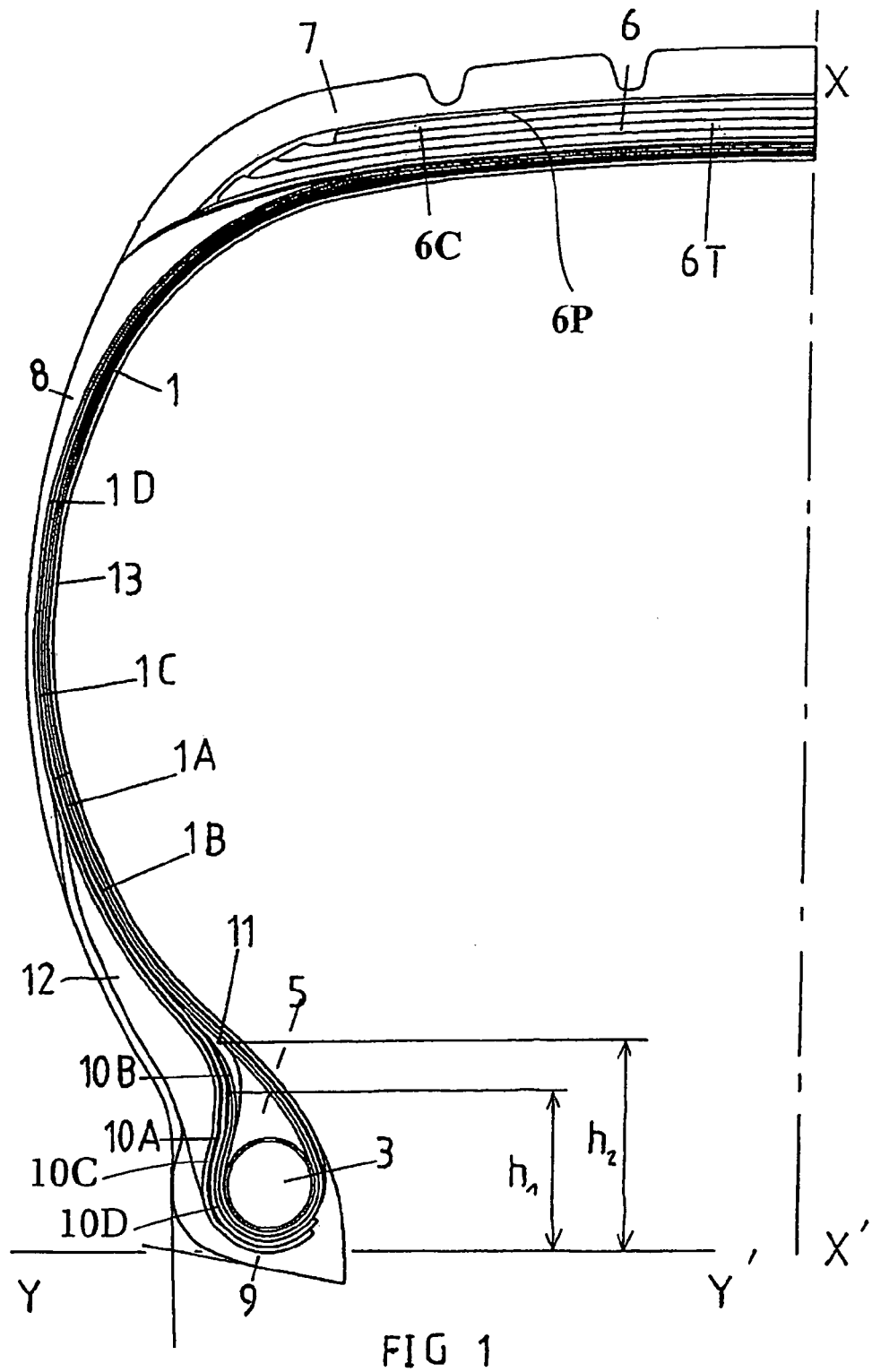
FIG. 1 shows a diagram, viewed in meridian section, of a tire according to the invention.
Figure 2:
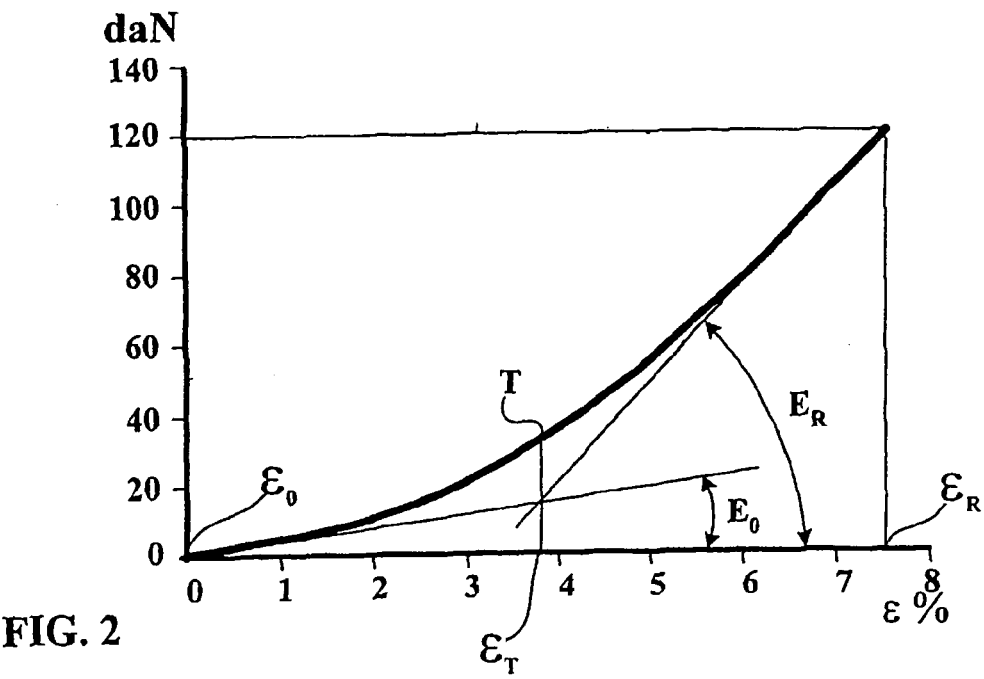
FIG. 2 shows an example of a force-elongation curve of a reinforcement element of the carcass reinforcement of the tire of FIG. 1.

The carcass reinforcement plies 1A to 1D of the aircraft tire in question are formed of composite cables consisting of two yarns of aromatic polyamide, each yarn having a linear density of 330 tex, individually overtwisted by an S twist of 230 twists/meter, and of a yarn of aliphatic polyamide (more precisely of nylon), the linear density of which is equal to 188 tex, said yarn being individually overtwisted by an S twist of 230 twists/meter. The three yarns thus previously twisted on themselves are then plied together with a Z twist of 230 twists/meter to form the cable ready to be used in plies. In FIG. 2, there can be seen the curve of traction as a function of the relative elongation (or deformation) of a cable thus constituted of these three yarns; this curve has a transition point T for a relative elongation $\epsilon_T$ equal to 3.8%, and the ratio $Eo/E_R$ of the gradient Eo of the tangent to said curve at the origin ($\epsilon_0$ zero) to the gradient $E_R$ of the tangent to said curve at break is 0.175. In the present case, the cable used has a breaking load substantially equal to 120 daN for a deformation of 7.5%.

In the case set forth, the plies 1A to 1D use the same cable, although this is not an essential feature of the invention. However, the density differs according to the plies: it is greater for the axially inner plies, 83 cables/decimeter as compared with 75 cables/decimeter for the axially outer plies.

The rubber mix, which coats the composite cables of the plies 1A and 1B of the carcass reinforcement, is based on natural rubber and, in the vulcanized state, has a secant modulus of extension, at 10% relative elongation, equal to 5.4 MPa, said modulus being measured under the conditions advocated by the standard referred to above. The rubber mix which coats the composite cables of the plies 1C and 1D of the carcass reinforcement, still based on natural rubber, has a secant modulus of extension, measured under the same conditions, equal to 12.0 MPa. The layers of rubber mix of low thickness which are possibly arranged between carcass plies and/or which border the ends of plies follow the same law of moduli: any layer pertaining to the plies 1A and 1B has a modulus less than the modulus of any layer pertaining to the plies 1C and 1D.

The radial carcass reinforcement 1 is radially surmounted by a crown reinforcement 6 comprising on one hand a working reinforcement 6T and radially to the outside a protective reinforcement 6P. The working reinforcement 6T is obtained by winding, in a zigzag on a more or less cylindrical form and from one edge of said reinforcement to the other, a strip of 8 composite cables of the same nature and same structure as the cables used for the carcass plies (the density of the working reinforcement 6T is 73 cords per decimeter). The winding is effected first at an angle of 5° and is extended until a complete layer of 5° cables is obtained, then the laying angle is modified to adopt a value of 9°, the winding continuing until the number of crossed layers necessary is obtained, that is to say six for the dimension in question.

The rubber mix for coating the cables of the strip used is based on natural rubber and has a secant modulus of extension, measured under the same conditions as the preceding moduli, equal to 8.5 MPa. The protective crown reinforcement 6P is composed of at least one ply formed of elements of aromatic polyamide 330/2 plied at 450 twists/m, the elements forming an angle of between 45 and 70° and more precisely in the case described equal to 60° with the circumferential direction. This protective crown reinforcement 6P is disconnected from the working reinforcement 6T by a layer of rubber mix 6C which facilitates the operation of renovation of the tread. The protective reinforcement may also be formed of a ply of metal reinforcement elements which undulate in the plane of the ply, in accordance with the teaching of U.S. Pat. No. 4,402,356, with an orientation of the average axis of undulation of 90°±5° or 0°±5° relative to the circumferential direction.

A tread 7, sidewalls 8, external protection layers for the beads 9, profiled elements for filling beads 11, 12, and also an internal rubber layer 13, as is known, complete the constitution of the tire in question.

Figure 3:
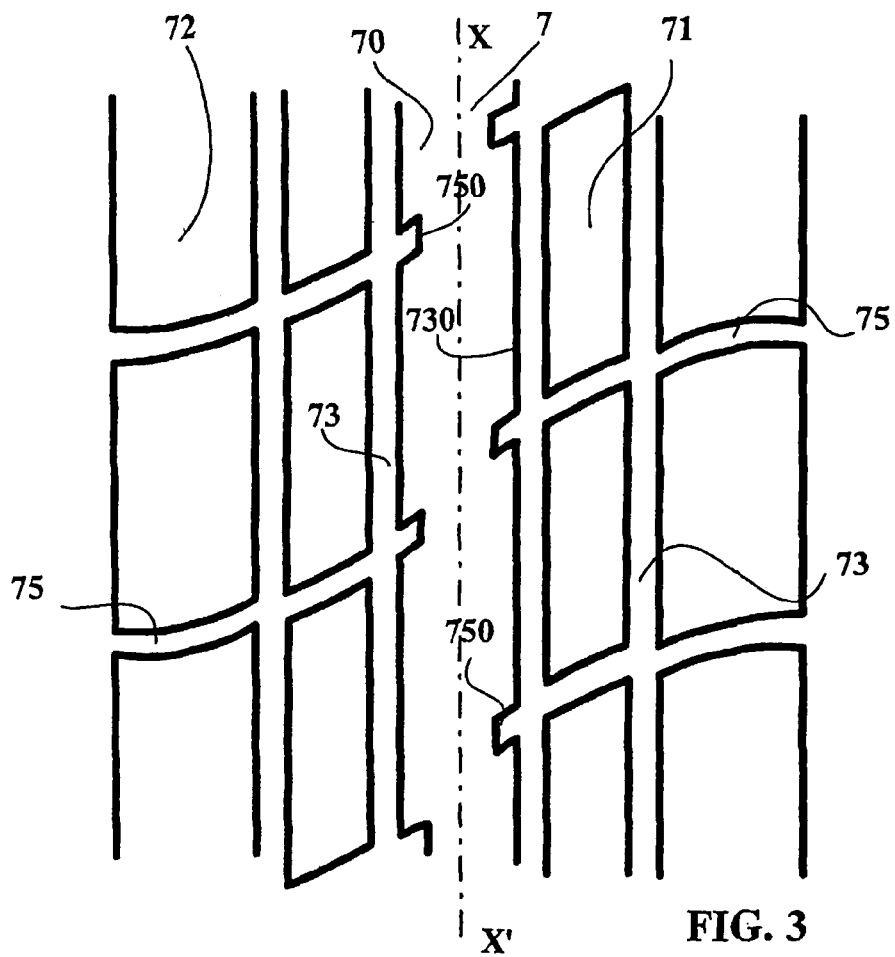
FIG. 3 shows the tread pattern of a tire tread according to the invention.

The architecture described above, with a carcass reinforcement 1 and a working crown reinforcement 6T composed of composite reinforcement elements, owing to the dimensional stability of the tire obtained, permits the advantageous use of a tread pattern comprising blocks as shown in FIG. 3. A tread 7 comprises five ribs, one central rib 70, then two intermediate ribs 71, the tread edges 7 being two lateral ribs 72, and said ribs being axially separated by circumferential grooves 73. The intermediate ribs 71 and the lateral ribs 72 are circumferentially divided into blocks by grooves of transverse general orientation 75, the axially inner ends 750 of which are slightly closer to the equatorial plane XX' of the tire than are the axially inner walls 730 of the longitudinal grooves 73 closest to said plane, and the central rib 70 being devoid of grooves 75 passing through it. Said transverse grooves 75 are slightly curved with an average orientation (measured by the angle formed by the straight line joining the two ends with the circumferential direction) of between 45° and 70°, that is to say the same orientation as the radially subjacent protective ply 6P. They are arranged on either side of the equatorial plane XX' so as to form a non-directional tread pattern design, that is to say one which is usable without specifying a direction of travel. A combination of the architecture of the reinforcement plies according to the invention with the tread pattern such as described on one hand permits better grip on ground which has been made slippery by wetted dust, and on the other hand permits better resistance when traveling at very low pressure (pressure less than one third of the operating pressure) and at high speed.

Furthermore, a tire such as described above was tested successfully in accordance with Standard TSO C62D. Compared with a tire of the same dimension and comprising a carcass reinforcement composed of eight plies of aliphatic polyamide, the reduction in weight of the tire is 15%, and the manufacturing time is reduced by 20%.

Furthermore, it was noted that the use of composite reinforcement elements as reinforcement elements for the crown reinforcement, owing to the great dimensional stability of the tire obtained in its crown part thanks to said reinforcement elements, permits the use of the same tread pattern provided with blocks (FIG. 3). Surprisingly, it is noted that this advantage is retained independently of whether or not the carcass reinforcement comprises reinforcement elements of the same type. The problems which may be noted with conventional crown reinforcements in aircraft tires, in particular of fatigue at the bottom of grooves, are resolved here.

The invention claimed is:

1. An aircraft tire, inflated to high pressure, having a tread, a crown reinforcement and a radial carcass reinforcement, this radial carcass reinforcement comprising a plurality of textile reinforcement elements oriented substantially radially by forming an angle of between 80° and 100° with the tire's circumferential direction, this reinforcement being anchored to at least one circumferential reinforcement armature within each bead, wherein this tire comprises means for imparting a dimensional stability and then limit the tensile stresses in order to improve the resistance to ozone attack and have a better resistance to the propagation of cracks or notches initiated by foreign bodies in said tread, wherein the means for imparting a dimensional stability comprises the provision of composite cables as reinforcement elements of the crown reinforcement, said composite cables being formed of textile yarns of different elasticity moduli at low deformations and having a curve representing the tensile force as a function of the relative elongation of each reinforcement element of the carcass reinforcement is substantially composed of a two part curve on each side of a transition point corresponding to the relative elongation between 1% and 7%, said curve having a gradient at the origin (zero deformation) and a gradient at break (deformation $\epsilon R$), the ratio of the gradient of the tangent to the curve at the point of zero relative elongation $\epsilon 0$ to the gradient of the tangent to the same curve at the point of elongation at break $\epsilon R$ being between 0.08 and 1.0, and wherein the breaking load of a reinforcement element being greater than 70 cN/tex, wherein the composite cable crown reinforcement elements form at least one twin ply of two layers of crossed elements obtained by winding, in a zigzag around a more or less cylindrical support and from one edge of said reinforcement to the other, a strip of at least one reinforcement element until at least said two layers of crossed elements form angles of opposing directions of between 8° and 30° with the circumferential direction.

2. A tire according to claim 1 wherein the carcass is composed of reinforcement elements identical to the reinforcement elements of the crown reinforcement.

* * * * *